Patented July 16, 1940

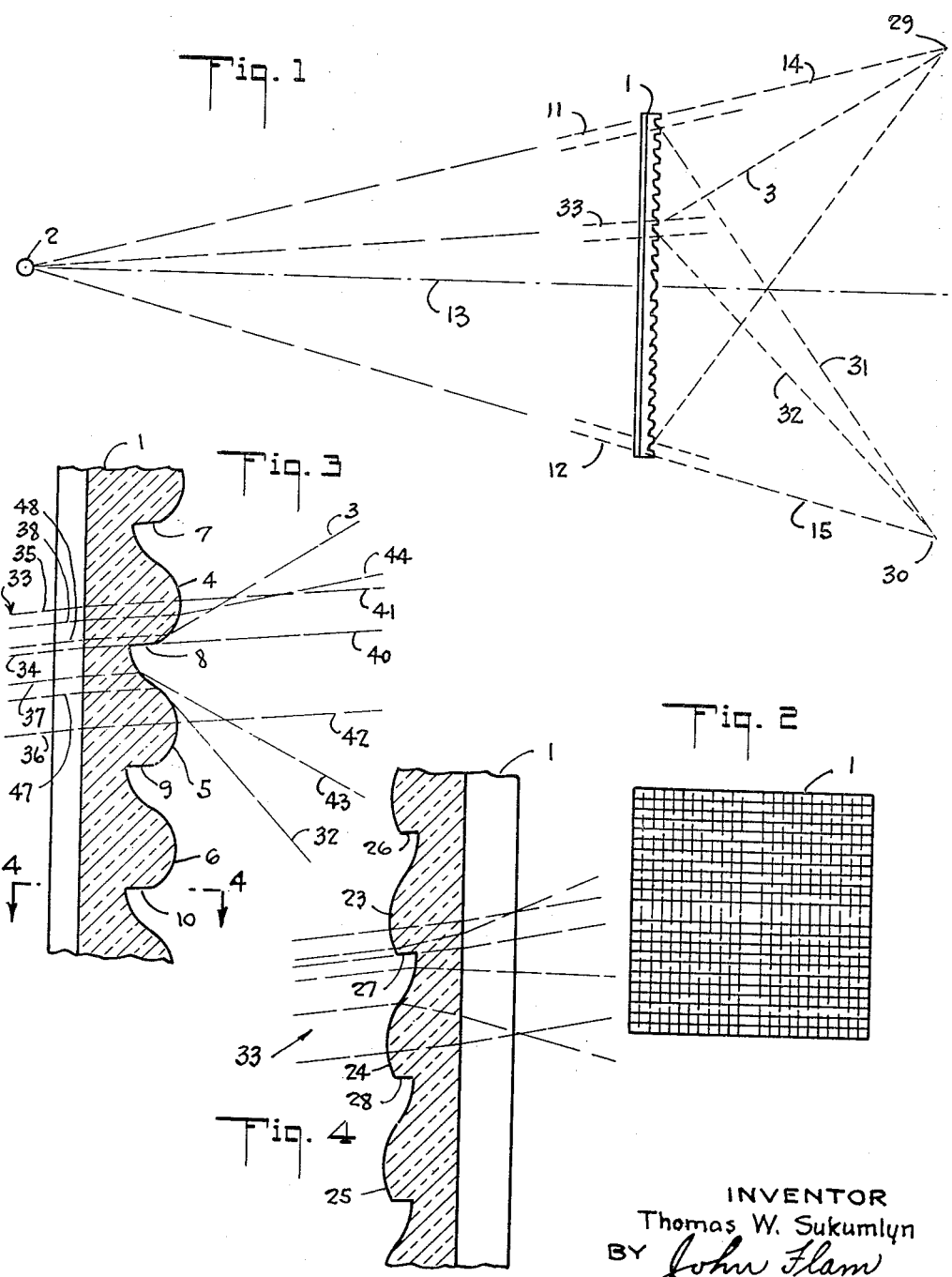

2,207,835

UNITED STATES PATENT OFFICE 2,207,835

PROJECTION SCREEN

Thomas W. Sukumlyn, Los Angeles, Calif.

Application December 27, 1937, Serial No. 181,839

6 Claims. (Cl. 88—24)

This invention relates to a screen upon which images are intended to be projected. For example, the screen may be used for the projection of motion pictures, or for television, upon which screen images, corresponding to reception of television signals may be built up. The screen may also be used as a background in a motion picture set.

The audience or spectators for viewing motion or television pictures, whether congregated in a relatively small space, as in the home, or in a public auditorium, are usually purposely so arranged with respect to the screen that the lines of vision from the spectators all fall within a restricted horizontal angle and a restricted vertical angle. Such an arrangement is advisable so as to eliminate serious distortion of the view by the spectators occupying the extreme positions. Usually the horizontal angle is wider than the vertical angle.

In television especially, the problem of adequate screen illumination is acute. At any particular instant only an elemental portion of the screen is illuminated. It is only by virtue of the persistence of vision that the entire screen appears to be illuminated. The apparent brightness of the image formed on the screen is of course considerably less than if the whole screen area be illuminated all at once by a bright beam.

By the aid of the present invention, the illumination on the screen is so conserved as to be most effective only between the extreme lines of vision. In other words, all of the rays refracted or reflected by the screen are caused to fall substantially entirely within the limiting lines of vision. And this is accomplished even where the rays are propagated from a source at a finite distance from the screen, thereby causing the rays to be non-parallel.

When the screen is used as a background, it is interposed between a source of light and the camera. In such use, it is necessary that the illumination be substantially uniform over the entire surface of the screen, and that there be no bright spots or areas where the illumination is markedly greater than that prevailing over the rest of the screen.

In the present invention, the screen is so formed that a ray of light falling on each elemental area of the screen is refracted so as to be spread between the limiting lines of vision. Thus, the illumination of the screen, when seen from a point between these lines, is uniform.

This invention possesses many other advantages, and has other objects which may be made more easily apparent from a consideration of one embodiment of the invention. For this purpose there is shown a form in the drawing accompanying and forming part of the present specification. The form will now be described in detail, illustrating the general principles of the invention; but it is to be understood that this detailed description is not be taken in a limiting sense; since the scope of this invention is best defined by the appended claims.

Referring to the drawing:

Figure 1 is a diagrammatic representation of a system of projection utilizing the novel screen, the screen being shown in horizontal section;

Fig. 2 is a front view thereof;

Fig. 3 is an enlarged fragmentary horizontal section of the screen; and

Fig. 4 is an enlarged vertical section, taken along plane 4—4 of Fig. 3.

The screen 1 is shown in the present instance as interposed between a source of illumination 2 and a space where spectators are intended to be located. It is intended to be made from translucent material, such as glass. The source 2 is shown as quite close to the screen 1. Therefore, the rays cast upon screen 1 diverge from source 2, and pass through screen 1 by refraction.

The source 2 may represent a motion picture projector or a television receptor mechanism, by the aid of which the screen 1 is scanned at a rapid rate, as by a moving pencil of light or elemental ray emanating from source 2.

Since the spectators (located on the right hand side of the screen 1, as viewed in Fig. 1) are purposely grouped within relatively narrow angular confines, the illumination of screen 1 by the rays emanating from the source 2 should be such as to confine the visible illumination substantially within the extreme angles of vision of the spectators, thereby ensuring a more brilliant image. If the incident rays were all parallel and normal to screen 1, the refraction of the rays through screen 1 could be obtained by forming the screen surface into a series of appropriate smoothly curved cylindrical surfaces, joined to form a substantially continuous sinuous contour. In view of the fact that the source of illumination 2 is assumed to be quite closely spaced from the screen 1, such a surface is incapable of confining the refracted rays to the desired extreme angles of vision. By the aid of the present invention, the configuration of the screen 1 is such that all of the refracted rays are substantially entirely caused to be confined between these desired extreme lines of vision.

The vertical spread of the refracted rays may be confined within a rather narrow angle. This is so because the spectators whose eyes are at the highest level have a line of vision not very much higher than the spectators whose eyes are at the lowest level of vision.

On the contrary, the horizontal permissible spread is usually greater and is determined by the shape of the room where the projections are taking place. The extreme spread corresponds in this case, to the lines of vision of spectators occupying opposite sides of the room, and closest to the screen. If the room be quite wide, the angle between these two extreme positions might be quite considerable.

The manner in which the confining of the rays as desired for both the horizontal and vertical directions is accomplished, is disclosed most clearly in Figs. 3 and 4.

In Fig. 3 it is seen that one side of the screen, such as the side which is to be viewed, comprises a series of cylindrically curved portions 4, 5, 6, etc. Each of these curved portions comprises a concave and a convex cylindrical surface smoothly joined together. Each curved surface 4, 5 and 6 is separated from the adjacent surface by a plane stepped surface, such as 7, 8, 9, or 10. These plane surfaces connect the convex portion of one curved surface with the concave portion of the adjacent curved surface. Furthermore, the planes passing through these plane surfaces 7, 8, etc. are not parallel but are arranged so as to diverge substantially in accordance with the desired spread of the refracted rays. The spacing from one plane surface, such as 7, to the next plane surface 8, is of such an order as to comply with the horizontal width of the elemental beam ordinarily utilized in television reception. Furthermore, the degrees of curvature of both the concave and convex surfaces, making up the surfaces 4, 5, and 6, are graduated from one cylindrical surface, such as 4, to the next cylindrical surface, to comply with the requirements now to be set forth. For the extreme positions 11 and 12 (Fig. 1) of the incident elemental beam, the elements of the beam are bent or refracted to spread this elemental beam between the limits 29 and 30 which form the extreme boundaries of vision. The spread for the extreme elemental beam 11 is thus represented by lines 14 and 31. For the elemental beams such as 33, falling closer to the normal 13, the divergence is represented by lines 3 and 32. Accordingly the refracted beams emerging through the surfaces 4, 5, 6, etc. are spread between the angles falling within the enveloping lines 14 and 15.

The curved surfaces of screen 1 are symmetrically arranged with respect to the normal 13. The conditions of refraction of an elemental beam such as 33, intermediate the normal 13 and the extreme boundary beam 11 is indicated in Fig. 3. Thus the lines 34, 35, 36, 37, 38, 47 and 48 represent component parts of such a beam. The part 34 is refracted so as to emerge at the level of the plane surface 8 and in the direction indicated by line 40. The outer components 35 and 36 are refracted to the same degree, and emerge substantially parallel to this component 40, as indicated by lines 41 and 42. The intermediate components, such as 37 and 38, are refracted by different amounts to emerge along lines 43 and 44 respectively. Corresponding lines 3 and 32 of greater refraction are indicated to correspond with the elementary portions 47 and 48. The curved surface for each elemental beam is so proportioned that the outermost parts thereof, after refraction such as indicated by lines 3 and 32, substantially pass through the points 29 and 30, representing the required limits of vision. The intermediate components are substantially equally distributed between them; thus at all points between limits 29 and 30, substantially equal amounts of light are received. These effects are secured by appropriate choice of the curvatures of the surfaces, determined in accordance with the desired spread and the indices of refraction. Thus far only the rays spaced in a horizontal direction have been considered. The spread of the rays may also be controlled in a vertical direction, as indicated by similar concave and convex surfaces 23, 24, 25, arranged on that side of screen 1 which is directed toward the source 2 and transversely to the surfaces 4, 5, 6, etc. Plane surfaces 26, 27, 28, etc. each provide steps between adjacent cylindrical surfaces 23, 24, 25. In this case, however, since the spread of each ray should be less, the degrees of curvature are generally less. In other respects the surfaces on the front and back of the screen 1 operate in similar manner. The plane surfaces 26, 27, 28, etc., diverge to agree with the required spread of the rays.

What is claimed is:

1. A translucent screen adapted to have one side exposed to a source of illumination and to be viewed from the opposite side, and having lines of vision all falling within an angle of vision, one side of the screen having a series of parallel smoothly curved surfaces, each of said surfaces having a convex and a concave portion, the concave portion of one surface being joined to the convex portion of the next adjacent surface, by a plane surface, the respective plane surfaces between said curved surfaces diverging from the screen and on the side viewed from, the degree of curvature of the curved surfaces being graduated from one surface to the next, whereby light falling on the screen is refracted so as to be confined, and to spread substantially uniformly, within the angle of vision.

2. A translucent screen adapted to have images formed thereon, and which is adapted to be exposed to a source of illumination and to be viewed from the opposite side, and having lines of vision defining a restricted angle of vision with respect to the screen, said screen having means to transmit the received illumination so that it is substantially completely confined, as well as substantially uniformly distributed, between said lines of vision, said means comprising a series of parallel ogee curved surfaces, the concave portion of one surface being joined to the convex portion of the next adjacent surface by a plane surface, the plane surfaces converging in the direction of the source of illumination, the degree of curvature of said curved surfaces being graduated from one surface to the next.

3. A translucent screen adapted to have images formed thereon, and which is adapted to be exposed to a source of illumination and to be viewed from the opposite side, and having lines of vision defining a restricted angle with respect to the screen, said screen having means to substantially completely confine the transmitted illumination and to distribute it substantially uniformly, within the said restricted angle, said means including a series of parallel, smoothly curved surfaces, each of said surfaces having a convex portion as well as a concave portion, the concave portion of one surface being joined to the convex portion of the next adjacent surface by a plane surface, the degree of curvature of the curved surfaces being graduated from one surface to the next, the respective plane surfaces diverging toward the viewing side of the screen, said surfaces adjacent the boundaries of the screen having planes substantially coinciding with the planes defining the angle of vision.

4. A translucent screen upon which images are intended to be formed and which is adapted to be exposed to a source of illumination in such a way that elemental areas are illuminated with varying intensity, and to be viewed from the opposite side, and having lines of vision all falling within a restricted angle of vision, one side of the screen having a series of parallel smoothly curved surfaces, each surface of said series being substantially the width of an elemental beam, and having a convex and a concave portion, the concave portion of one surface being joined to the convex portion of the next adjacent surface by a plane surface, the respective plane surfaces between said curved surfaces diverging from the screen on the side viewed from, the degree of curvature of the curved surfaces being graduated from one surface to the next, whereby light falling on the screen from an elemental beam is refracted so as to be substantially completely confined as well as substantially completely uniformly distributed within the angle of vision.

5. A translucent screen upon which images are intended to be formed and which is adapted to be exposed to a source of illumination in such a way that elemental areas are illuminated with varying intensity, and to be viewed from the opposite side, and having lines of vision all falling within a restricted angle of vision, one side of said screen comprising a series of plane surfaces, the lines of intersection between said surfaces and the screen being substantially parallel and separated by spaces equal to substantially the width of an elemental beam, said planes diverging from the screen at angles which progressively vary from the center of the screen to the edge of the screen, the planes of the outermost surfaces substantially coinciding with the planes defining the angle of vision, smoothly curved surfaces joining the inner and outer edges of adjacent plane surfaces, the degree of curvature of the curved surfaces being graduated from one surface to the next, whereby light falling on the screen from an elemental beam is refracted so as to be substantially completely confined as well as substantially completely uniformly distributed within the angle of vision.

6. The structure set forth in claim 4, in which the other side of the screen has similar curved and plane surfaces arranged transversely with respect to the first mentioned surfaces.

THOMAS W. SUKUMLYN.